United States Patent
Nichols

[11] Patent Number: 5,806,234
[45] Date of Patent: Sep. 15, 1998

[54] FISHING LURE JIG HEAD AND BODY

[75] Inventor: Mark Nichols, Palm City, Fla.

[73] Assignee: D.O.A. Lures, Inc., Palm City, Fla.

[21] Appl. No.: 709,303

[22] Filed: Sep. 9, 1996

[51] Int. Cl.⁶ .................................................. A01K 85/00
[52] U.S. Cl. ........................................ 43/42.37; 43/42.39
[58] Field of Search ................................ 43/42.1, 42.37, 43/42.38, 42.39, 42.09, 42.24, 42.32

[56] References Cited

U.S. PATENT DOCUMENTS

| | | | |
|---|---|---|---|
| 1,993,018 | 3/1935 | Pfeifle | 43/42.39 |
| 2,235,600 | 3/1941 | Ammerman | 43/42.32 |
| 2,927,392 | 3/1960 | Lievense | 43/42.37 |
| 2,955,378 | 10/1960 | Burke | 43/42.39 |
| 3,343,296 | 9/1967 | Dams | 43/42.37 |
| 3,413,749 | 12/1968 | Jeffers | 43/42.37 |
| 3,611,614 | 10/1971 | Ward | 43/42.33 |
| 3,724,117 | 4/1973 | Flanagan | 43/42.37 |
| 3,868,784 | 3/1975 | Sabol | 43/42.37 |
| 3,909,974 | 10/1975 | Kent | 43/42.37 |
| 4,141,170 | 2/1979 | Fosher | 43/42.24 |
| 4,907,364 | 3/1990 | Hedman | 43/42.39 |
| 5,564,220 | 10/1996 | Blicha | 43/42.39 |

FOREIGN PATENT DOCUMENTS 2672773  8/1992  France .................................. 43/42.24

*Primary Examiner*—Kurt Rowan
*Attorney, Agent, or Firm*—James R. Cwayna

[57] ABSTRACT

A lead head fishing lure including a generally flexible body and a hook receivable into the body which includes a weighted portion, a hook portion, a positioning portion and an eye or eyelet portion which extends upwardly through the body for attachment to the fishing line. The body includes at least one planar surface which enhances its movements through the water. The hook portion may include singular or multiple hooks and with simple hook displacement and body modification the lure will function as a weedless lure.

11 Claims, 1 Drawing Sheet

U.S. Patent    Sep. 15, 1998    5,806,234
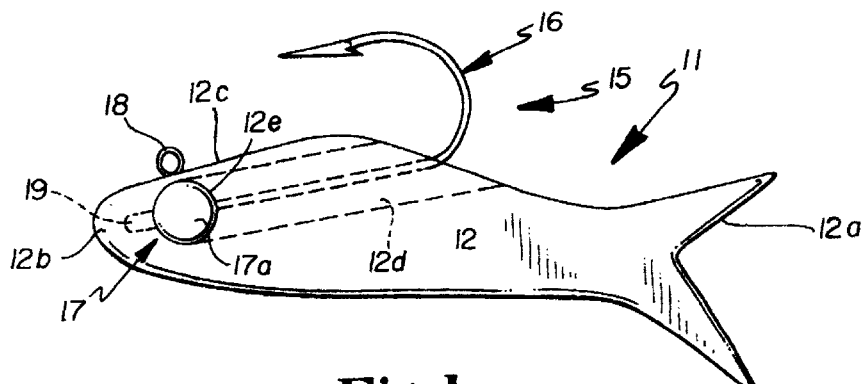
Fig. 1
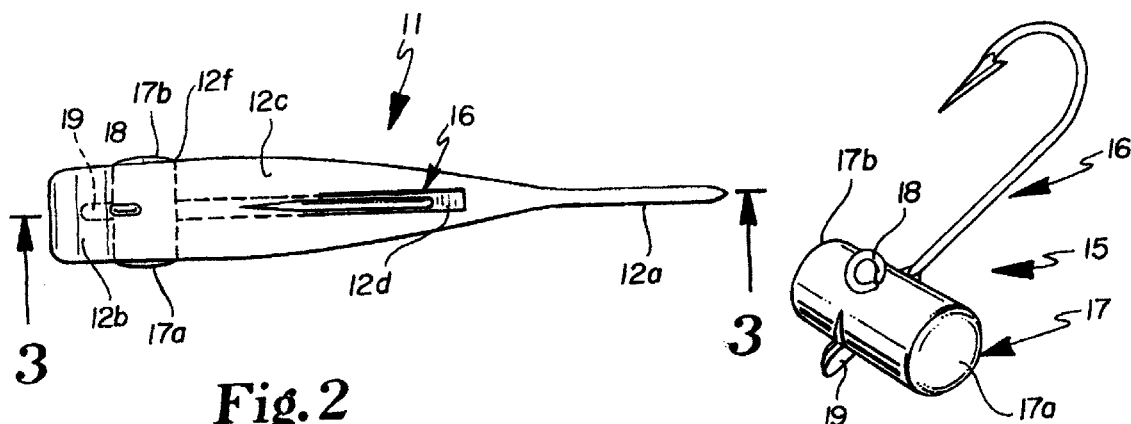
Fig. 2
Fig. 4
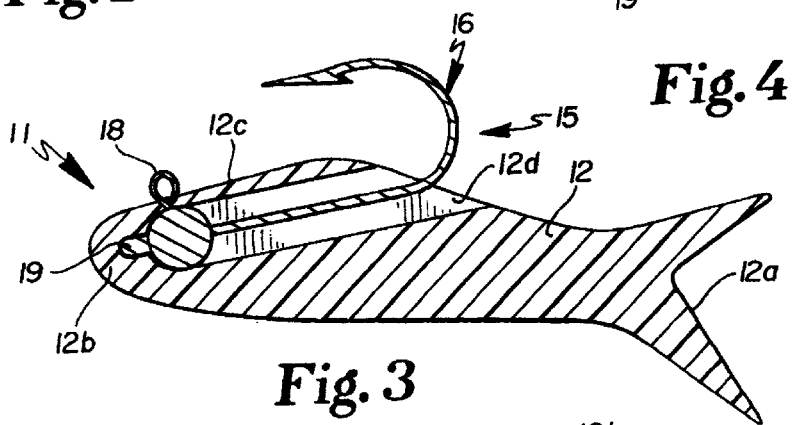
Fig. 3
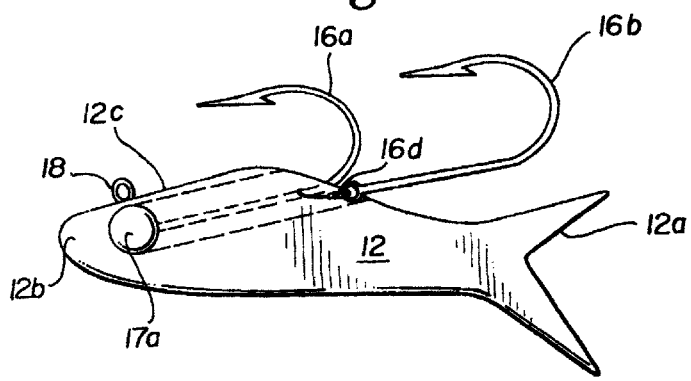
Fig. 5

5,806,234

FISHING LURE JIG HEAD AND BODY

RELATED APPLICATIONS

There are no related applications by the inventor that should be considered in the prosecution of this application.

SPONSORSHIP

This invention has not been made under any Federally or privately sponsored arrangement or agreement.

FIELD OF THE INVENTION

This invention relates generally to fishing lures and more specifically to flexible bodied jigging head lures or lead head lures which are commonly identified and well known in the art.

The lure can be made into a weedlesss lure with only a few modifications.

The lure is also designed for particular plunging and swimming motions.

SUMMARY OF THE INVENTION

A fishing lure including a flexible body and a hook which is insertable into the body through an eye aperture in the body which hook includes a weighted portion, a locating element for positioning interiorally of the body, an eye or eyelet to extend through the body for attachment to a line and which may include holographic or reflective eyes which extend through the sides of the flexible body and which are carried by the weighted hook portion.

The body includes a planar surface extending rearwardly and upwardly from the nose or frontal portion of the lure that increases its plunging, diving and swimming movements for lifelike action as it is retrieved through or jigged vertically in the water. The hook portion may include singular or multiple hooks. With a single hook style, with minimal body or hook modifications, the lure will function as a weedless lure.

BACKGROUND AND OBJECTS OF THE INVENTION

Jigs and lead head lures are well known in the fishing art. Commonly a soft bodied unit is provided and a hook is simply forced or placed through the forward area or head of the soft body. These units, though usable, have several shortcomings. A primary shortcoming being that they are not and do not develop swimming actions to move the lure with a side to side, plunging or diving motion to simulate the natural motion of a bait fish.

The invention disclosed herein provides an improved lure which includes a flexible body specifically designed with at least one planar surface which increases its life like movement as it is retrieved or vertically jigged through the water.

The invention also includes an insertable hook which has a weighted section, eye portion, which may include reflective and therefore attractive eyes which are designed to extend through the sides of the flexible body, a locating tang or pin for proper placement into the body and an eye or eyelet for line attachment.

The invention also includes modification means whereby the unit may be rendered weedless.

It is therefore an object of the invention to provide a fishing lure, known to the industry as a jig or lead head jig which incorporates a flexible body having at least one planar surface to increase its life like actions as it is retrieved through or jigged vertically in the water.

It is a further object of the invention to provide a fishing lure incorporating a flexible body with an insertable hook portion which includes a weighted section, a reflective or holographic eye portion to extend through eye apertures formed through the sides of the body and a single or multiple hook arrangement.

These and other advantages and improvements of the invention will appear from a consideration of the accompanying disclosure and drawings.

DESCRIPTION OF THE DRAWINGS

FIG. 1 is a side elevation of a typical illustrative lure embodying the concepts of the invention having portions shown in dotted lines to illustrate the molded area for placement of the hook into the body;

FIG. 2 is a top plan view of the lure of the invention;

FIG. 3 is a longitudinal section taken substantially along Line 3—3 of FIG. 2

FIG. 4 is a perspective view of the hook portion of the invention; and,

FIG. 5 is a side view of the invention as the same would be employed with multiple hooks.

DESCRIPTION OF THE INVENTION

In accordance with the accompanying drawings, FIG. 1 is a side elevation of a typically formed flexible body lure designated in its entirety 11 consisting of a body 12 formed of a flexible material and illustrating a hook structure 15 arranged therein. As illustrated, the body resembles, in the selected form, a minnow or relatively small bait fish or the like having the body, 12, tail 12a and a head 12b. Intermediate the body 12 and extending rearwardly from the head 12b is a specifically arranged planar section 12c which provides for more life-like swimming and plunging movement. Also within the head 12b and spaced from the forwardmost end of the head 12b are a pair of eye apertures 12e, 12f on the respective sides of the head 12b.

The applicant has provided this planar portion 12c to more effectively provide for an improved, life-like swimming or simulated swimming motion as the lure is retrieved or jigged in the water whether the retrieval is horizontal or vertical. This results from the planar surface always confronting or facing the water and therefore providing or forming a blocking surface which disrupts laminar flow and causes the lure to move relatively erratically.

The body 12, provides a generally central slit 12d through which the hook portion is located. The hook element 15 and shank 16 are inserted through one of the eye apertures 12e or 12f of the body and rotated to properly position the hook in 15 relation to the planar surface 12c. Obviously, to permit movement of the hook through an eye aperture and to exit the slit 12d, there must be a communicating passage through the body, The hook 15, as illustrated in FIG. 4 consists of a barbed hook shank 16, a laterally extending, weighted section 17, an eyelet 18 for line attachment and a locating tine 19. The lateral ends 17a, 17b of the weighted section 17 may be provided with reflective or holographic elements to more closely portray a minnow or other bait fish. As illustrated in FIG. 2, when the hook 15 is inserted into the body 12, weighted section 17 will extend through the side eye apertures 12e, 12f of the body with the hook itself exiting through the upper surface of the lure, specifically through slot or slit 12d which also locates it behind the planar surface 12c with the line attachment 18 extending through the planar section 12c of the body 12 to be easily attachable to the users fishing line.

It should be noted that when the hook 15 is inserted into the body that the positioning tang 19 will hold the same with proper vertical respect to the body 12 and that the frontmost portion of the lure 12b will completely cover weighted 17 and other portions of the hook 15 the hook 15 and provide a soft nose to the unit. This frontmost portion or nose 12b of the body 12b will assist the user of the lure to more easily retrieve the same from rocks or other entanglements due to the compressibility and resiliency of the same.

As illustrated, the body 12 of the lure is provided with an access channel or slot 12d through which the hook element or member 15 will pass when inserted through the one of the eye apertures 12e, 12f of the body. The body 12 is provided with side apertures through which the sides 17a, 17b of weighted section 17 will be positioned and the frontal tang or pin 19 of hook 15 will register the hook 15 into the body 12. This arrangement also positions eyelet 18 through the upper portion of the body 12 and particularly through the aforementioned planar surface 12c.

The aspect of an insertable hook in a particular location does not appear in the prior art as the primary prior art simply provides a body through which a hook is inserted with its exit being at the foremost area of the provided body.

The planar area 12c of body 12 increases the motion of the lure as it is pulled or retrieved through the water to increase its diving and plunging motion as well as its side-to-side movement. It is also highly effective when the lure is used when ice fishing as an upward movement of the lure brings this planar surface, with the upward movement, into non-laminar conditions which cause various sideways movements.

As stated in the objects, this lure may be made into a relatively weedless lure through several methods.

A first and simplest method would be to utilize a smaller barbed hook 16 area.

A second would be to modify the depth of slit or slot 12d to allow the entire hook 15 to be lowered more deeply into the slot or slit 12d. This would obviously rotate the hook 15 about the weighted section 17 which would slightly lift the tang 19 from the position shown and would similarly move the line attachment unit 18 rearwardly but it would still lie within the planar surface.

Another obvious modification would be to increase the entire depth of the lure or vertical dimension of the lure, as it is illustrated.

In any of these manners, the hook could be relatively covered by the flexible body. This would not cause any problems in fishing as when a fish strikes, the body being of flexible material would essentially collapse away from the barb and the fish would be hooked. However, with the relatively covered hook 15, the lure would essentially be weedless. Also with the hook being arranged on the upper surface of the lure the weedlessness is enhanced from those jigs where the hook exits the bottom of the lure.

FIG. 5 is an illustration of the body 12 and illustrating at least two hook elements, designated 16a, 16b. Again, the body includes the planar portion 12c, eyelet 18, weighted section 17 extending through the lateral sides of body 12, tail section 12a and all similar elements as disclosed for the single hook version. The multiple or double hook sections 16a, 16b may be joined through a plurality of means including monofilament line or a wire element 16d. Similarly, they may be formed in a "gang" hook arrangement.

The uniqueness of the invention includes many differentiations from the prior art. These include the insertable, weighted hook into a flexible body with the body having a particular planar section which contributes to its motion through the water, the aspect of the weighted section having positionable arrangement within the body and including reflective or holographic eyes which are arranged in position within the body and extend exteriorly of the body.

What is claimed is:

1. A fishing lure jig head and body including;
   a. a flexible body resembling a bait fish having a frontal portion, body and tail; a top and a bottom and sides;
   b. a pair of eye apertures formed through said body adjacent said frontal portion;
   c. a slit in the top of said body communicating with said eye apertures;
   d. a planar surface formed on the top of said body extending rearwardly from said frontal portion;
   e. a hook element having a shank, a barbed end and a weighted section; and,
   f. said hook element insertable through one of said eye apertures to have the barbed end exit said slit and position said weighted section in said eye apertures.

2. The fishing lure jighead and body as set forth in claim 1 wherein said planar surface is arranged and constructed to produce non-laminar flow and therefore erratic movement as the lure is retrieved through the water.

3. The fishing lure jig head and body as set forth in claim 1 and said eye apertures being spaced from the frontal portion of said body to provide a flexible frontmost area.

4. The fishing lure jig head and body as set forth in claim 1 and said hook element including a forwardly directed tine for placement into a selected area of said flexible body to assist placement of and retention of said hook element relative to said body within said slit.

5. The fishing lure jighead and body as set forth in claim 1 and said hook element including a line connecting element arranged and constructed to extend upwardly through said planar surface when said hook element is in proper position whereby the lure is attachable to a fishing line.

6. The fishing lure jig head and body as set forth in claim 1 and said weighted section including a lateral extending member having a pair of ends such that each end of said section may exit through one of said eye apertures when said hook element is properly positioned in said body.

7. The fishing lure jig head and body as set forth in claim 6 and each of said ends of said weighted section being provided with a reflective material.

8. The fishing lure jig head and body as set forth in claim 6 and each of said ends of said weighted section being provided with holographic material.

9. The fishing lure jig head and body as set forth in claim 1 where in the depth of said slit may be modified such that the sides thereof will substantially cover said shank of said hook element.

10. The fishing lure jig head and body as set forth in claim 1 and the size of said hook element being selected such that said hook element is substantially enclosed.

11. The fishing lure jig head and body as set forth in claim 1 wherein said hook element includes a plurality of hooks.

* * * * *